June 19, 1962  W. C. MALLISON  3,039,980
PROCESS FOR PREPARING RESINOUS MATERIALS
Filed July 17, 1959
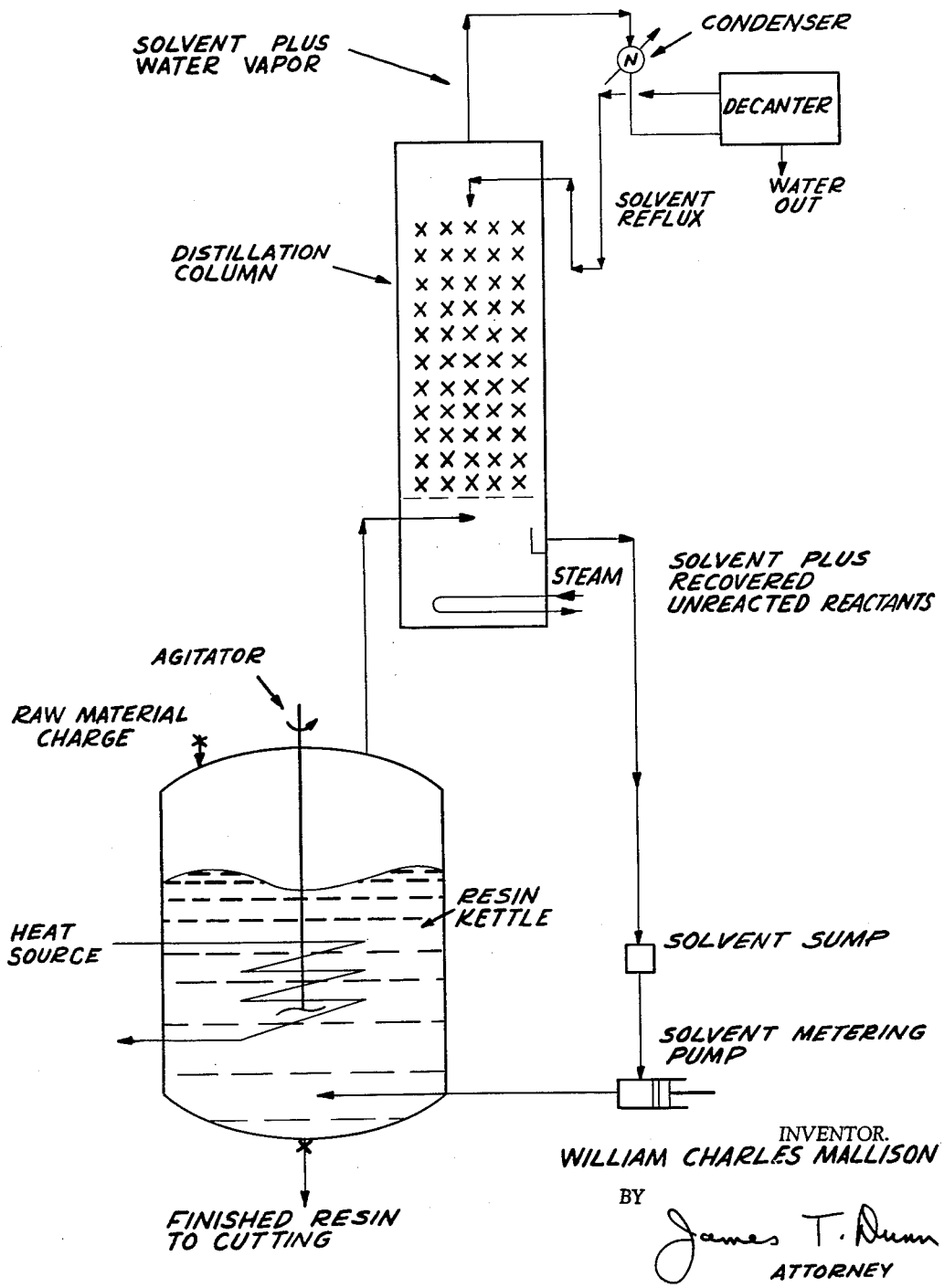
INVENTOR.
WILLIAM CHARLES MALLISON
BY James T. Dunn
ATTORNEY United States Patent Office 3,039,980
Patented June 19, 1962

3,039,980
PROCESS FOR PREPARING RESINOUS MATERIALS
William Charles Mallison, Westport, Conn., assignor to American Cyanamid Company, New York, N.Y., a corporation of Maine
Filed July 17, 1959, Ser. No. 827,938
18 Claims. (Cl. 260—22)

This invention relates to a technique for conducting an esterification process in the production of a polyester resin composition. More particularly, this invention relates to the technique of conducting an esterification process in which a polyhydric alcohol and a polycarboxylic acid are heated at an elevated temperature in which the water of esterification is removed from the reaction zone by passing therethrough an inert, organic, normally-liquid solvent having a boiling point below the esterification temperature. Still further, this invention relates to a technique for producing polyester resins such as unsaturated polyester resins, oil-modified or oil-free alkyd resins, and the like by an efficient, money-saving procedure.

One of the objects of the present invention is to produce polyester resins by removing the water of esterification and salvaging the unreacted reactants removed therewith. A further object of the present invention is to produce polyester resins by an esterification process in which an inert, organic, normally-liquid solvent is passed through the reacting reactants thereby removing the water of esterification as produced and recycling the unreacted reactants inadvertently removed therefrom. These and other objects of the present invention will be discussed in greater detail hereinbelow.

Polyester resins have as a general class a plurality of applications in industry. Unsaturated polyester resins such as those prepared by reacting a glycol with an alpha, beta-ethylenically unsaturated dicarboxylic acid are useful in the field of laminating resins. Alkyd resins, on the other hand, such as those produced by reacting a polyhydric alcohol with a polycarboxylic acid free of non-benzenoid unsaturation, whether oil-modified or not, have utility in the field of coating resins such as varnishes, enamels, and the like. Regardless of the ultimate end use of these polyester resins, the initial processing is substantially the same, namely the reaction of a polycarboxylic acid with a polyhydric alcohol at esterification temperatures, namely above about 150° C. which results in the formation of water of esterification which needs to be removed from the esterification sphere in order that the polyester resin formation can proceed. In the production of polyester resins, the reaction tends to be at least in part a reversible one in which the esterification goes forward and produces the water of esterification and thereafter hydrolysis tends to set in breaking down the esterification product to its starting materials. It is then desirable to remove the water of esterification from the reaction vessel by an expeditious approach but it has been found that in the past the removal of said water results in the removal of small but significant quantities of unreacted reactants, namely the polyhydric alcohol and/or the polycarboxylic acid. It is unquestionably desirable to remove the water of esterification but such removal carries with it the necessary evil of removing these unreacted reactants which may become lost to the process and, as a consequence, add to the cost of production of these polyester resins. I have found that by passing an inert, organic, normally-liquid solvent having a boiling point below 150° C. through the reacting reactants that I can remove the water of esterification and although additionally remove small quantities of the unreacted reactants, I am able to separate the water from the reactants in a condensation mechanism followed by the subsequent return of the solvent in combination with the condensed reactants to the reaction sphere.

The resinous materials prepared in the process of the present invention are identified generically as polyester resinous materials which result from the esterification of a polyhydric alcohol and a polycarboxylic acid. Although there are a substantial number of different kinds of these polyester resins, there are two principal commercial polyester resins to which the instant process is immediately applicable. One of these polyester resins is identified generally as an unsaturated polyester resin inasmuch as said resin is prepared by reacting a polyhydric alcohol and preferably a dihydric alcohol with an alpha, beta-ethylenically unsaturated polycarboxylic acid and preferably an alpha, beta-ethylenically unsaturated dicarboxylic acid. The second category of commercially available resinous materials to which the instant process would be applicable are the glyceride oil-modified alkyd resins. Each of these classes of resins will be discussed in greater detail hereinbelow. The unsaturated polyester resins produced in the present invention are subsequently blended with a polymerizable monomer and upon proper catalysis are converted to a thermoset condition into such useful materials as laminates, and the like. The glyceride oil-modified alkyd resins, on the other hand, are frequently styrenated in the presence of an inert solvent to produce coating compositions such as baking enamels, and the like.

In order to achieve substantially complete esterification of the polycarboxylic acid with the polyhydric alcohol, heating is continued at elevated temperatures in the range of about 150° C. to 320° C. and preferably from about 150° C. to 220° C. for unsaturated polyesters and from about 200° C. to about 260° C. for alkyd resins until a relatively low acid number is achieved. There is no significant criticality in the acid number although generally it is desired to continue the reaction until the acid number is dropped below 100 and preferably below 40. In the instance of unsaturated polyester resins, in which there is used an alpha, beta-ethylenically unsaturated dicarboxylic acid, it is frequently conventional in certain instances to continue the esterification reaction until the acid number has dropped below 10. To accomplish this, it is generally desired to utilize the polyhydric alcohol in an amount calculated, on a stoichiometrical basis, to be sufficient, and preferably in excess by 10% to 30% of the amount required, to completely esterify the acid component or components.

In the preparation of the polyester resins of the present invention, one may utilize any of the polyhydric alcohols such as ethylene glycol, propylene glycol, diethylene glycol, dipropylene glycol, trimethylene glycol, tetramethylene glycol, pinacol, arabitol, xylitol, adonitol, mannitol, glycerol, trimethylol propane, trimethylol ethane, sorbitol, pentaerythritol, dipentaerythritol, or the alkane diols such as butanediol-1,4, pentanediol-1,5, hexanediol-1,6, and the like. These polyhydric alcohols may be used either singly or in combination with one another. In the preparation of unsaturated polyester resin compositions where use is made of an alpha, beta-ethylenically unsaturated discarboxylic acid, it is generally preferred that the polyhydric alcohol used be predominantly a dihydric alcohol although minor amounts up to about 10 to 25% of higher hydric alcohols such as trihydric, tetrahydric, hexahydric alcohols may be used. In the unsaturated polyester resins, it is generally desired that there be produced a linear polyester resin with polymerizable sites available for cross-linking with the polymerizably reactive monomer. For the purpose of making unsaturated polyester resins, then it can be seen that the diols, and more particularly the glycols, are preferred. When the blend of a dihydric alcohol with a polyhydric alcohol having more than two hydroxy groups are utilized, the average functionality of the alcohols used should not be significantly above about 2.25. In the preparation of alkyd resins including oil-modified alkyd resins, it is generally desired to utilize polyhydric alcohols having the functionality of 3 or more although dihydric alcohols may be used in combination with those polyhydric alcohols having three or more hydroxy groups. In making such an alkyd resin, the average functionality of the alcohols used should not be appreciably below about 2.75.

In the preparation of the polyester resins used in the process of the present invention whether they be unsaturated polyester resins or alkyd resins, one may utilize such polycarboxylic acids as those polycarboxylic acids which are free of non-benzenoid unsaturation including phthalic acid, oxalic acid, malonic acid, succinic acid, glutaric acid, sebacic acid, adipic acid, pimelic acid, suberic acid, azelaic acid, tricarballylic acid, citric acid, tartaric acid, maleic acid, and the like. Obviously, these acids may be used either singly or in combination with one another and the anhydrides of said acids, whenever available, may be used either singly or in combination with one another or in combination with the acids. Among the alpha, beta-ethylenically unsaturated polycarboxylic acids which may be used in the practice of the process of the present invention are maleic acid, fumaric acid, aconitic acid, itaconic acid, chloromaleic acid, and the like. The anhydrides of these acids may be used, whenever available. These acids and/or their anhydrides may be used either singly or in combination with one another. In the preparation of alkyd resins, it is generally conventional to utilize a polycarboxylic acid which is free of non-benzenoid unsaturation although minor amounts of alpha, beta-ethylenically unsaturated polycarboxylic acids may be used. Ordinarily, the polycarboxylic acid free of non-benzenoid unsaturation is used exclusively in the preparation of alkyd resins whether oil-modified or not, but up to about 10% on a mol basis of an alpha, beta-ethylenically unsaturated acid may be used, based on the total mols of polycarboxylic acid used, in alkyd resins. In the unsaturated polyester resins, it is desirable to utilize the alpha, beta-ethylenically unsaturated acids in an amount approximating at least 20% by weight of the total weight of the polycarboxylic acids used and preferably in amounts varying between about 25% and 65% by weight based on the total weight of polycarboxylic acid used, the balance being polycarboxylic acids free of non-benzenoid unsaturation.

In the manufacture of oil-modified alkyd resins, it is conventional to use any of the glyceride oils or the fatty acids of glyceride oils or their monoglycerides. Among the glyceride oils which may be used in the production of the oil-modified alkyd resins are coconut oil, palm oil, babassu oil, murumuru oil, rape seed oil, mustard seed oil, olive oil, peanut oil, sesame oil, corn oil, cotton seed oil, soya oil, sunflower oil, walnut oil, linseed oil, perilla oil, castor oil, either raw or dehydrated, tung oil, oiticica oil, whale oil, menhaden oil, sardine oil, herring oil, and the like. Among the fatty acids derived from such oils which may be used in the manufacture of oil-modified alkyd resins are caproic acid, caprilic acid, capric acid, lauric acid, myristic acid, palmitic acid, stearic acid, arachitic acid, behenic acid, lignostearic acid, and the like. Certain unsaturated monocarboxylic acids derived from glyceride oils are utilized conventionally including myristoleic acid, palmitoleic acid, oleic acid, linoleic acid, linolenic acid, elaeostearic acid, licanic acid, ricinoleic acid, erucic acid, and the like. As these fatty acids are derived from these glyceride oils, they frequently occur in admixture with one another. The fatty acid component derived from tall oil may also be utilized in the manufacture of alkyd resins. This tall oil fraction is generally distilled one or more times in order to remove the rosin acid component, unsaponifiable materials, ash, and the like. The amount of oil utilized in the manufacture of oil-modified alkyd resins can be varied very considerably from short oil to medium oil or long oil classifications and may be non-drying, semi-drying or drying oils. These classifications are all well known in the art and further delineation of detail relating thereto is deemed to be unnecessary. Reference is made, however, to the publication "Organic Coating Technology," volume 1, by Henry Fleming Payne, published by John Wiley & Sons, Inc., in 1954. Attention is directed particularly to page 280, among other pertinent parts of the disclosure.

In these esterification reactions, no catalyst is necessary as the esterification proceeds quite smoothly without use thereof. However, if one wished to make use of an esterification catalyst, there are a number of the same readily available in the art which would find application for this purpose.

The inert, organic, normally-liquid water-immiscible solvent having a boiling point below about 150° C. which may be used in the practice of the process of the present invention may be selected from any of the commercially available solvents meeting this description. Included in that group are benzene, toluene, xylene, ethyl benzene, methyl cyclohexane, cyclohexane, petroleum hydrocarbon cuts having a distillation temperature below about 150° C. and the like. These inert solvents may be used either singly or in combination with one another. The amount of solvent passed through the reaction vessel can be varied rather substantially such as between about 1% and about 50% by weight per hour based on the total weight of reactants initially charged to the resin kettle. Preferably, the amount of inert solvent used will be varied between about 5% and about 20% by weight per hour based on the total weight of reactants initially charged. It should be observed that the lower molecular weight solvents will yield more volume of volatilized material per unit weight than the higher molecular weight solvents per unit weight and for this reason, among others, the low molecular weight liquid inert solvents are preferred.

When a polyhydric alcohol and a polycarboxylic acid are introduced into a suitable reaction vessel and heated to the temperature at which polyester resin formation is accomplished, said temperature will vary considerably depending upon the particular reactants utilized. In some instances, this temperature is reached at about 150° C. whereas in other instances, the esterification reaction begins to proceed rapidly at temperatures above 175° C. such as 185° C. and higher. This point in the reaction course can readily be observed by noticing a rapid evolution of water. Prior to this rapid evolution of water, there is doubtlessly being formed some significant measure of monoester. One can determine from experience at what temperature the rapid evolution of water will take place for a set of given reactants. The initial introduction of solvent will commence at about 10 or 15° C. below that temperature at which rapid evolution of water will take place. In introducing the solvent into the reaction kettle, one would preferably pre-heat the solvent to a temperature near the boiling point of the solvent and introduce the warmed solvent into the resin kettle preferably at a point just beneath the agitator. The volatilization of the solvent causes some heat loss but by pre-heating the solvent to a temperature just below its boiling point, this heat loss is kept at a minimum. However, if cold solvent were to be introduced into the reaction vessel at 10 or 15° C. below the take-off temperature, cooling would be experienced which would be undesirable if the heat loss could not be tolerated, but if the heat loss is not of consequence, the cool solvent, i.e., at 25° C., would disperse throughout the reactants before volatilization and would prove advantageous because of the widespread distribution of solvent before vaporization.

Reference is made to the accompanying drawing which is virtually self-explanatory. The polyhydric alcohol and polycarboxylic acid are introduced into the resin kettle at the point indicated as Raw Material Charge and the kettle is heated with constant agitation utilizing steam or Dowtherm in a coil within the kettle to bring the charge up to within 15 degrees of the take-off temperature. The take-off temperature is defined as that temperature at which the rapid evolution of water takes place as described in greater detail hereinabove. At that temperature, pre-heated solvent of the class described is introduced into the resin kettle at a selected rate as referred to hereinabove and released into the reactants at a point preferably immediately below the agitator. The pre-heater as such as not shown on the accompanying drawing inasmuch as it is optional. If desired, the pre-heater could be located between the solvent metering pump and the resin kettle. Alternatively, one could introduce the inert solvent into the top of the distillation column and by flowing downwardly through said heated column, the solvent would become pre-heated and in passing through the solvent sump and the solvent metering pump would enter the resin kettle in a pre-heated state. Alternatively, the inert solvent could be introduced directly into the resin kettle from the solvent metering pump at room temperature initially and would become warmed in the course of the process and would be recycled back to the resin kettle in a pre-heated condition. The solvent stream is continued steadily as the resin kettle contents are heated further to the take-off temperature. As the solvent is being distributed throughout the resin kettle, it volatilizes and picks up the water of esterification which is also volatilized. Inadvertently, some quantities of the polycarboxylic acid and the polyhydric alcohol are also picked up in this volatilized stream. This effluent stream passes up out of the resin kettle and up into the distillation column which is cooled sufficiently to permit the condensation of the polycarboxylic acid and the polyhydric alcohol but not cool enough to condense either the solvent or the water. The lower portion of the distillation column is heated initially and continuously by means of a steam coil in order to reflux the solvent in the distillation column upon being returned to said column after separation from the water. The refluxing solvent will be able to pick up the condensed reactants and carry them in a recycling operation back to the resin kettle. The distillation column is maintained at a temperature sufficient to prevent an azeotrope from developing at atmospheric pressure. This temperature in the distillation column can be varied considerably depending on the type of inert, organic solvent utilized and the amount of the same in comparison with the amount of water of esterification coming into the distillation column. When a low boiling solvent like benzene is used, the temperature in the distillation column is maintained above the azeotropic temperature of said mixture, namely above 69.3° C. whereas with toluene the temperature would be maintained above the azeotropic temperature such as above 84.1° C. More solvent should be maintained in the column than that amount which is necessary to maintain an azeotrope with water. The mixture of solvent and water vapor is carried upwardly out of the distillation column to a condenser which cools the gaseous mixture down and condenses both the solvent and the water. The condensed mixture of solvent and water is passed into a vessel designed to permit decantation of the solvent from the water. The solvent is, of course, immiscible with the water and the water forming the heavier layer can readily be drawn out from the bottom of the decanter while the lighter organic layer is solvent refluxed from the decanter back into the top of the distillation column where, as said before, it passes down through the distillation column and picks up by absorption, the reactants, and the solution of inert solvent and reactants is collected in the solvent sump and passed through the solvent metering pump together with additional fresh solvent of the same class, if necessary, to the solvent pre-heating chamber. When the polyester resin has been completely prepared as is indicated by the selected acid number, the finished resin can be removed from the bottom of the resin kettle for storage or further processing.

In order that the concept of the present invention may be more completely understood, the following examples are set forth in which all parts are parts by weight unless otherwise indicated. These examples are set forth primarily for the purpose of illustration and any enumeration of detail contained therein should not be interpreted as a limitation on the case except as is indicated in the appended claims.

*Example 1*

Into a suitable reaction vessel equipped as the resin kettle of the accompanying drawing, there is introduced 592 parts of phthalic anhydride, 1032 parts of linseed oil monoglyceride and 116 parts of 98% glycerine. The charge is heated gradually to about 200° C. whereupon there is introduced into the resin kettle at a point just below the revolving agitator a stream of toluene in an amount and at a rate calculated to approximate 10% by weight per hour based on the total weight of the reactants in the vessel. The heating is continued with the temperature being elevated gradually to about 220° C. and held at that temperature until esterification is substantially complete as indicated by an acid number of about 20. Throughout this time, the toluene has become vaporized upon contact with the hot resin forming materials carrying with it the water of esterification, when and as produced, some phthalic anhydride and some glycerol. The phthalic anhydride and the glycerol are condensed in the distillation column while the water and the toluene continue upwardly to their own condenser. The liquified water-toluene mix is passed from the condenser to the decanter, the water drawn out from the base thereof while the toluene is returned from the top thereof through a solvent refluxing system to the top of the distillation column where the toluene picks up the phthalic anhydride and the glycerol and the solution thereof is passed down to the solvent sump, preparatory to being recycled through the pre-heater back to the resin kettle.

*Example 2*

Into a suitable reaction vessel comparable to the resin kettle of the accompanying drawing, there is introduced 667 parts of diethylene glycol, 232 parts of fumaric acid and 584 parts of adipic acid. The charge is heated gradually to a temperature of about 165° C. whereupon there is introduced a steady stream of pre-heated benzene in an amount sufficient to approximate 11% by weight per hour based on the total weight of reactants in the resin kettle. The heating is continued at a temperature of about 200° C. until an acid number between about 35 and 40 is reached. While achieving this degree of esterification, the water of esterification is constantly being removed as produced together with some unreacted reactants. As in Example 1, the reactants are condensed out of the effluent stream in the distillation chamber while the bulk of the solvent and substantially all of the water pass on to the condenser. The water and benzene are then condensed and collected in the decanter where the water is removed from the system and the benzene is recycled down in a reflux state through the distillation column picking up in solution the reactants present. As before, the solution of the reactants in the benzene are collected in the sump and upon the necessary pre-heating are passed again into the resin kettle. This procedure is continued until no further appreciable quantities of water or reactants are being removed from the reaction vessel whereupon the inert solvent is flashed off through the distillation column and condensed but not returned to the resin kettle, stripping the polyester resin thus produced from substantially all of the inert solvent. The hot polyester resin thus produced may then be removed from the resin kettle for further processing, if necessary.

I claim:

1. An esterification process comprising;
   (a) heat-reacting a polyhydric alcohol and a polycarboxylic acid at a temperature above 150° C. while passing an inert, organic, normally-liquid, water-immiscible solvent having a boiling point below about 150° C. through the reactants so as to vaporize said solvent, thereby removing, from the reaction sphere, vaporized water of esterification and vaporized unreacted reactants,
   (b) absorbing said unreacted reactants in a refluxing solvent stream in a distillation column without condensing the inert solvent and water,
   (c) condensing said volatilized solvent and water vapor,
   (d) separating the condensed solvent from the water,
   (e) recombining said solvent with the condensed reactants and
   (f) returning said solvent and unreacted reactants to the reaction sphere below the level of the liquid reaction mixture in said sphere wherein said solvent boils below the temperature of the reaction mass under the conditions of the reaction.

2. An esterification process comprising;
   (a) heat-reacting a glycol and an alpha, beta-ethylenically unsaturated dicarboxylic acid at a temperature above 150° C. while passing an inert, organic, normally-liquid, water-immiscible solvent having a boiling point below about 150° C. through the reactants so as to vaporize said solvent, thereby removing, from the reaction sphere, vaporized water of esterification and vaporized unreacted reactants,
   (b) absorbing said unreacted reactants in a refluxing solvent stream in a distillation column without condensing the inert solvent and water,
   (c) condensing said volatilized solvent and water vapor,
   (d) separating the condensed solvent from the water,
   (e) recombining said solvent with the condensed reactants and
   (f) returning said solvent and unreacted reactants to the reaction sphere below the level of the liquid reaction mixture in said sphere wherein said solvent boils below the temperature of the reaction moss under the conditions of the reaction.

3. An esterification process comprising;
   (a) heat-reacting glycerol and phthalic anhydride at a temperature above 150° C. while passing an inert, organic, normally-liquid, water-immiscible solvent having a boiling point below about 150° C. through the reactants so as to vaporize said solvent, thereby removing, from the reaction sphere, vaporized water of esterification and vaporized unreacted reactants,
   (b) absorbing said unreacted reactants in a refluxing solvent stream in a distillation column without condensing the inert solvent and water,
   (c) condensing said volatilized solvent and water vapor,
   (d) separating the condensed solvent from the water,
   (e) recombining said solvent with the condensed reactants and
   (f) returning said solvent and unreacted reactants to the reaction sphere below the level of the liquid reaction mixture in said sphere wherein said solvent boils below the temperature of the reaction mass under the conditions of the reaction.

4. An esterification process comprising;
   (a) heat-reacting glycerol, phthalic anhydride and a glyceride oil at a temperature above 150° C. while passing an inert, organic, normally-liquid, water-immiscible solvent having a boiling point below about 150° C. through the reactants so as to vaporize said solvent, thereby removing, from the reaction sphere, vaporized water of esterification and vaporized unreacted reactants,
   (b) absorbing said unreacted reactants in a refluxing solvent stream in a distillation column without condensing the inert solvent and water,
   (c) condensing said volatilized solvent and water vapor,
   (d) separating the condensed solvent from the water,
   (e) recombining said solvent with the condensed reactants and
   (f) returning said solvent and unreacted reactants to the reaction sphere below the level of the liquid reaction mixture in said sphere wherein said solvent boils below the temperature of the reaction mass under the conditions of the reaction.

5. An esterification process comprising;
   (a) heat-reacting ethylene glycol and maleic anhydride at a temperature above 150° C. while passing an inert, organic, normally-liquid, water-immiscible solvent having a boiling point below about 150° C. through the reactants so as to vaporize said solvent, thereby removing, from the reaction sphere, vaporized water of esterification and vaporized unreacted reactants,
   (b) absorbing said unreacted reactants in a refluxing solvent stream in a distillation column without condensing the inert solvent and water,
   (c) condensing said volatilized solvent and water vapor,
   (d) separating the condensed solvent from the water,
   (e) recombining said solvent with the condensed reactants and
   (f) returning said solvent and unreacted reactants to the reaction sphere below the level of the liquid reaction mixture in said sphere wherein said solvent boils below the temperature of the reaction mass under the conditions of the reaction.

6. An esterification process comprising;
   (a) heat-reacting propylene glycol and fumaric acid at a temperature above 150° C. while passing an inert, organic, normally-liquid, water-immiscible solvent having a boiling point below about 150° C. through the reactants so as to vaporize said solvent, thereby removing, from the reaction sphere, vaporized water of esterification and vaporized unreacted reactants,
   (b) absorbing said unreacted reactants in a refluxing solvent stream in a distillation column without condensing the inert solvent and water,
   (c) condensing said volatilized solvent and water vapor,
   (d) separating the condensed solvent from the water,
   (e) recombining said solvent with the condensed reactants and
   (f) returning said solvent and unreacted reactants to the reaction sphere below the level of the liquid reaction mixture in said sphere wherein said solvent boils below the temperature of the reaction mass under the conditions of the reaction.

7. An esterification process comprising;
   (a) heat-reacting glycerol, phthalic anhydride and soya oil at a temperature above 150° C. while passing an inert, organic, normally-liquid, water-immiscible solvent having a boiling point below about 150° C. through the reactants so as to vaporize said solvent, thereby removing, from the reaction sphere, vaporized water of esterification and vaporized unreacted reactants,
   (b) absorbing said unreacted reactants in a refluxing solvent stream in a distillation column without condensing the inert solvent and water,
   (c) condensing said volatilized solvent and water vapor,
   (d) separating the condensed solvent from the water, (e) recombining said solvent with the condensed reactants and
(f) returning said solvent and unreacted reactants to the reaction sphere below the level of the liquid reaction mixture in said sphere wherein said solvent boils below the temperature of the reaction mass under the conditions of the reaction.

8. An esterification process comprising;

(a) heat-reacting a polyhydric alcohol and a polycarboxylic acid at a temperature above 150° C. while passing xylene through the reactants so as to vaporize said xylene, thereby removing, from the reaction sphere, vaporized water of esterification and vaporized unreacted reactants,
(b) absorbing said unreacted reactants in a refluxing xylene stream in a distillation column without condensing said xylene and water,
(c) condensing said volatilized xylene and water vapor,
(d) separating the condensed xylene from the water,
(e) recombining said xylene with the condensed reactants and
(f) returning said xylene and unreacted reactants to the reaction sphere below the level of the liquid reaction mixture in said sphere wherein said xylene boils below the temperature of the reaction mass under the conditions of the reaction.

9. An esterification process comprising;

(a) heat-reacting a polyhydric alcohol and a polycarboxylic acid at a temperature above 150° C. while passing benzene through the reactants so as to vaporize said benzene, thereby removing, from the reaction sphere, vaporized water of esterification and vaporized unreacted reactants,
(b) absorbing said unreacted reactants in a refluxing benzene stream in a distillation column without condensing the inert benzene and water,
(c) condensing said volatilized benzene and water vapor,
(d) separating the condensed benzene from the water,
(e) recombining said benzene with the condensed reactants and
(f) returning said benzene and unreacted reactants to the reaction sphere below the level of the liquid reaction mixture in said sphere wherein said benzene boils below the temperature of the reaction mass under the conditions of the reaction.

10. An esterification process comprising;

(a) heat-reacting ethylene glycol and maleic anhydride at a temperature above 150° C. while passing xylene through the reactants so as to vaporize said xylene, thereby removing, from the reaction sphere, vaporized water of esterification and vaporized unreacted reactants,
(b) absorbing said unreacted reactants in a refluxing xylene stream in a distillation column without condensing said xylene and water,
(c) condensing said volatilized xylene and water vapor,
(d) separating the condensed xylene from the water,
(e) recombining said xylene with the condensed reactants and
(f) returning said xylene and unreacted reactants to the reaction sphere below the level of the liquid reaction mixture in said sphere wherein said xylene boils below the temperature of the reaction mass under the conditions of the reaction.

11. An esterification process comprising;

(a) heat-reacting ethylene glycol and maleic anhydride at a temperature above 150° C. while passing benzene through the reactants so as to vaporize said benzene, thereby removing, from the reaction sphere, vaporized water of esterification and vaporized unreacted reactants,
(b) absorbing said unreacted reactants in a refluxing benzene stream in a distillation column without condensing the inert benzene and water,
(c) condensing said volatilized benzene and water vapor,
(d) separating the condensed benzene from the water,
(e) recombining said benzene with the condensed reactants and
(f) returning said benzene and unreacted reactants to the reaction sphere below the level of the liquid reaction mixture in said sphere wherein said benzene boils below the temperature of the reaction mass under the conditions of the reaction.

12. An esterification process comprising;

(a) heat-reacting propylene glycol and fumaric acid at a temperature above 150° C. while passing xylene through the reactants so as to vaporize said xylene, thereby removing, from the reaction sphere, vaporized water of esterification and vaporized unreacted reactants,
(b) absorbing said unreacted reactants in a refluxing xylene stream in a distillation column without condensing said xylene and water,
(c) condensing said volatilized xylene and water vapor,
(d) separating the condensed xylene from the water,
(e) recombining said xylene with the condensed reactants and
(f) returning said xylene and unreacted reactants to the reaction sphere below the level of the liquid reaction mixture in said sphere wherein said xylene boils below the temperature of the reaction mass under the conditions of the reaction.

13. An esterification process comprising;

(a) heat-reacting propylene glycol and fumaric acid at at temperature above 150° C. while passing benzene through the reactants so as to vaporize said benzene, thereby removing, from the reaction sphere, vaporized water of esterification and vaporized unreacted reactants,
(b) absorbing said unreacted reactants in a refluxing benzene stream in a distillation column without condensing the inert benzene and water,
(c) condensing said volatilized benzene and water vapor,
(d) separating the condensed benzene from the water,
(e) recombining said benzene with the condensed reactants and
(f) returning said benzene and unreacted reactants to the reaction sphere below the level of the liquid reaction mixture in said sphere wherein said benzene boils below the temperature of the reaction mass under the conditions of the reaction.

14. An esterification process comprising;

(a) heat-reacting glycerol, phthalic anhydride and soya oil at a temperature above 150° C. while passing xylene through the reactants so as to vaporize said xylene, thereby removing, from the reaction sphere, vaporized water of esterification and vaporized unreacted reactants,
(b) absorbing said unreacted reactants in a refluxing xylene stream in a distillation column without condensing the inert xylene and water,
(c) condensing said volatilized xylene and water vapor,
(d) separating the condensed xylene from the water,
(e) recombining said xylene with the condensed reactants and
(f) returning said xylene and unreacted reactants to the reaction sphere below the level of the liquid reaction mixture in said sphere wherein said xylene boils below the temperature of the reaction mass under the conditions of the reaction.

15. An esterification process comprising;

(a) heat-reacting a polyhydric alcohol and a polycarboxylic acid at a temperature above 150° C. while passing toluene through the reactants so as to vaporize said toluene, thereby removing, from the reaction sphere, vaporized water of esterification and vaporized unreacted reactants, (b) absorbing said unreacted reactants in a refluxing toluene stream in a distillation column without condensing said toluene and water, (c) condensing said volatilized toluene and water vapor, (d) separating the condensed toluene from the water, (e) recombining said toluene with the condensed reactants and (f) returning said toluene and unreacted reactants to the reaction sphere below the level of the liquid reaction mixture in said sphere wherein said toluene boils below the temperature of the reaction mass under the conditions of the reaction.

16. An esterification process comprising;

(a) heat-reacting ethylene glycol and maleic anhydride at a temperature above 150° C. while passing toluene through the reactants so as to vaporize said toluene, thereby removing, from the reaction sphere, vaporized water of esterification and vaporized unreacted reactants, (b) absorbing said unreacted reactants in a refluxing toluene stream in a distillation column without condensing said toluene and water, (c) condensing said volatilized toluene and water vapor, (d) separating the condensed toluene from the water, (e) recombining said toluene with the condensed reactants and (f) returning said toluene and unreacted reactants to the reaction sphere below the level of the liquid reaction mixture in said sphere wherein said toluene boils below the temperature of the reaction mass under the conditions of the reaction.

17. An esterification process comprising;

(a) heat-reacting propylene glycol and fumaric acid at a temperature above 150° C. while passing toluene through the reactants so as to vaporize said toluene, thereby removing, from the reaction sphere, vaporized water of esterification and vaporized unreacted reactants, (b) absorbing said unreacted reactants in a refluxing toluene stream in a distillation column without condensing said toluene and water, (c) condensing said volatilized toluene and water vapor, (d) separating the condensed toluene from the water, (e) recombining said toluene with the condensed reactants and (f) returning said toluene and unreacted reactants to the reaction sphere below the level of the liquid reaction mixture in said sphere wherein said toluene boils below the temperature of the reaction mass under the conditions of the reaction.

18. An esterification process comprising;

(a) heat-reacting glycerol, phthalic anhydride and soya oil at a temperature above 150° C. while passing toluene through the reactants so as to vaporize said toluene, thereby removing, from the reaction sphere, vaporized water of esterification and vaporized unreacted reactants, (b) absorbing said unreacted reactants in a refluxing toluene stream in a distillation column without condensing said toluene and water, (c) condensing said volatilized toluene and water vapor, (d) separating the condensed toluene from the water, (e) recombining said toluene with the condensed reactants and (f) returning said toluene and unreacted reactants to the reaction sphere below the level of the liquid reaction mixture in said sphere wherein said toluene boils below the temperature of the reaction mass under the conditions of the reaction.

References Cited in the file of this patent

UNITED STATES PATENTS

| | | |
|---|---|---|
| 2,182,397 | Eckey | Dec. 5, 1939 |
| 2,939,854 | Christenson et al. | June 7, 1960 |
| 2,957,837 | Smith et al. | Oct. 25, 1960 |
| 2,979,472 | Heinrich et al. | Apr. 14, 1961 |
| 2,991,259 | Carlston et al. | July 4, 1961 |

FOREIGN PATENTS

| | | |
|---|---|---|
| 235,595 | Great Britain | Apr. 22, 1926 |
| 664,311 | Great Britain | Jan. 2, 1952 |

UNITED STATES PATENT OFFICE
CERTIFICATE OF CORRECTION

Patent No. 3,039,980            June 19, 1962

William Charles Mallison

It is hereby certified that error appears in the above numbered patent requiring correction and that the said Letters Patent should read as corrected below.

Column 2, line 62, for "discarboxylic" read -- dicarboxylic --; column 7, line 47, for "moss" read -- mass --; column 10, line 40, for "at" read -- a --.

Signed and sealed this 30th day of October 1962.

(SEAL)
Attest:

ERNEST W. SWIDER
Attesting Officer

DAVID L. LADD
Commissioner of Patents